United States Patent
Kurata et al.

(10) Patent No.: US 11,631,855 B2
(45) Date of Patent: Apr. 18, 2023

(54) METHOD FOR PRODUCING SLURRY FOR NONAQUEOUS BATTERY ELECTRODES

(71) Applicant: SHOWA DENKO K. K., Tokyo (JP)

(72) Inventors: Tomonori Kurata, Kawasaki (JP); Kirida Kunanuruksapong, Himeji (JP); Mitsuru Hanasaki, Himeji (JP)

(73) Assignee: SHOWA DENKO K. K., Tokyo (JP)

( * ) Notice: Subject to any disclaimer, the term of this patent is extended or adjusted under 35 U.S.C. 154(b) by 308 days.

(21) Appl. No.: 16/766,986

(22) PCT Filed: Nov. 16, 2018

(86) PCT No.: PCT/JP2018/042470
§ 371 (c)(1),
(2) Date: May 26, 2020

(87) PCT Pub. No.: WO2019/107187
PCT Pub. Date: Jun. 6, 2019

(65) Prior Publication Data
US 2020/0395613 A1    Dec. 17, 2020

(30) Foreign Application Priority Data
Dec. 1, 2017 (JP) .............................. JP2017-232174

(51) Int. Cl.
| | | |
|---|---|---|
| *H01M 10/0525* | (2010.01) | |
| *H01M 10/058* | (2010.01) | |
| *H01M 4/62* | (2006.01) | |
| *H01M 4/04* | (2006.01) | |
| *H01M 4/139* | (2010.01) | |
| *H01M 50/10* | (2021.01) | |
| *H01M 4/88* | (2006.01) | |
| *H01M 4/64* | (2006.01) | |
| *H01M 4/02* | (2006.01) | |

(52) U.S. Cl.
CPC .......... *H01M 4/622* (2013.01); *H01M 4/0404* (2013.01); *H01M 4/139* (2013.01); *H01M 4/64* (2013.01); *H01M 4/8882* (2013.01); *H01M 10/058* (2013.01); *H01M 10/0525* (2013.01); *H01M 50/10* (2021.01); *H01M 2004/027* (2013.01)

(58) Field of Classification Search
CPC .......... H01M 4/62; H01M 4/139; H01M 4/04; H01M 4/34
See application file for complete search history.

(56) References Cited

U.S. PATENT DOCUMENTS

2019/0058195 A1    2/2019 Hanasaki et al.

FOREIGN PATENT DOCUMENTS

| | | |
|---|---|---|
| CN | 105580174 A | 5/2016 |
| EP | 2 988 351 A1 | 2/2016 |
| JP | 08-250123 A | 9/1996 |
| JP | 09-320604 A | 12/1997 |
| JP | 10-298386 A | 11/1998 |
| JP | 2014-120411 A | 6/2014 |
| JP | 2017-135062 A | 8/2017 |
| WO | 2014/171415 A1 | 10/2014 |
| WO | 2015/108109 A1 | 7/2015 |
| WO | 2015/146649 A1 | 10/2015 |
| WO | 2017/150200 A1 | 9/2017 |

OTHER PUBLICATIONS

Machine Translation of: JP 2014/120411, Inagaki et al., Jun. 30, 2014.*
International Search Report of PCT/JP2018/042470 dated Feb. 19, 2019 [PCT/ISA/210].

* cited by examiner

*Primary Examiner* — Kenneth J Douyette
(74) *Attorney, Agent, or Firm* — Sughrue Mion, PLLC

(57) ABSTRACT

The invention relates to a method for producing a slurry for a nonaqueous battery electrode, a method for producing a nonaqueous battery electrode, and a method for producing a nonaqueous battery. The method for producing a slurry for a nonaqueous battery electrode includes a dispersing step of dispersing a conductive auxiliary agent in an aqueous binder composition, and a mixing step of mixing the conductive auxiliary agent-containing binder composition obtained in the dispersing step with an active material. In the conductive auxiliary agent-containing binder composition, a particle diameter at which particles begin to appear, which is measured according to a degree of dispersion by a grain gauge method, is 90 μm or less.

12 Claims, No Drawings

METHOD FOR PRODUCING SLURRY FOR NONAQUEOUS BATTERY ELECTRODES

CROSS REFERENCE TO RELATED APPLICATIONS

This application is a National Stage of International Application No. PCT/JP2018/042470, filed Nov. 16, 2018, claiming priority to Japanese Patent Application No. 2017-232174, filed Dec. 1, 2017, the contents of all of which are incorporated herein by reference in their entirety.

TECHNICAL FIELD

The present invention relates to a method of producing a slurry for a nonaqueous battery electrode, a method of producing a nonaqueous battery electrode, and a method of producing a nonaqueous battery.

BACKGROUND ART

A nonaqueous battery using a nonaqueous electrolyte is superior to an aqueous battery in terms of higher voltage, smaller size, and lighter weight. Therefore, the nonaqueous batteries are widely used as power sources for notebook computers, mobile phones, power tools, and electronic and communication devices. In addition, nonaqueous batteries have recently been used for electric vehicles and hybrid vehicles from the viewpoint of application to environmental vehicles. Therefore, there is a strong demand for a nonaqueous battery having a higher output, a high capacity and a long life. As the nonaqueous battery, a lithium ion secondary battery is exemplified as a representative example.

The nonaqueous battery includes a positive electrode using a metal oxide or the like as an active material, a negative electrode using a carbon material such as graphite or the like as an active material, and a nonaqueous electrolyte solvent mainly containing carbonates or flame-retardant ionic liquids. The nonaqueous battery is a secondary battery. A secondary battery is a battery in which charging and discharging of the battery is performed by moving ions between a positive electrode and a negative electrode. The positive electrode is obtained by coating a slurry containing a metal oxide and a binder on the surface of a positive electrode current collector such as an aluminum foil, drying it, and cutting it into an appropriate size. The negative electrode is obtained by coating a slurry containing a carbon material and a binder on the surface of a negative electrode current collector such as a copper foil, drying it, and cutting it into an appropriate size. The binder binds the active materials to each other at the positive electrode and the negative electrode, binds the active material to the current collector, and prevents the active material from peeling from the current collector.

As a binder, a polyvinylidene fluoride (NMP) binder using an organic solvent-based N-methyl-2-pyrrolidone (NMP) as a solvent is well known (Patent Document 1). However, the binder has poor binding properties between the active materials and between the active materials and the current collector, and requires a large amount of the binder for actual use. Therefore, there is a disadvantage that the capacity of the nonaqueous battery is reduced. In addition, using NMP, which is an expensive organic solvent, as a binder also caused problems in the price of the final product. In addition, there was a problem in the preservation of the working environment in the slurry preparation or the current collector preparation.

As a method for solving these problems, development of water dispersion type binders has been promoted. For example, a styrene-butadiene rubber (SBR) water dispersion in which carboxymethyl cellulose (CMC) is used in combination as a thickener is known (Patent Document 2). The SBR dispersion is inexpensive because it is an aqueous dispersion, and is advantageous from the viewpoint of working environment conservation. Further, the binding property between the active materials and the binding property between the active materials and the current collector are relatively good. Therefore, the electrode can be produced by using a smaller amount of the binder than that of the PVDF binder, and the nonaqueous battery has the advantage of high output and high capacity. Therefore, the SBR dispersion is widely used as a binder for a nonaqueous battery electrode.

However, since it is necessary to use carboxymethyl cellulose as a thickener in combination with the SBR-based binder, the slurry preparation process is complicated. Further, regarding the binder, the binding property between the active materials and the binding property between the active materials and the current collector is insufficient, and when the electrode is produced with a small amount of the binder, there is a problem that a part of the active materials is peeled off in the process of cutting the current collector.

Patent Document 3 discloses a binder copolymer capable of reducing internal resistance, a slurry, an electrode, and a battery using the same. By using the binder copolymer, a battery having a sufficient binding force and a low internal resistance can be obtained.

[Patent Document 1] Japanese Unexamined Patent Application Publication No. H10-298386

[Patent Document 2] Japanese Unexamined Patent Application Publication No. H08-250123

[Patent Document 3] WO 2017/150200

SUMMARY OF THE INVENTION

However, when a conductive auxiliary agent such as carbon black is added in order to further reduce the internal resistance and improve the cycle characteristics, and an electrode is produced by the method disclosed in Patent Document 3, there is a disadvantage that aggregates of slurry are formed, and that aggregates and lumps in the electrode are formed.

An object of the present invention is to provide a method of producing a slurry for producing a nonaqueous battery electrode in which the dispersion of a conductive auxiliary agent in the nonaqueous battery electrode is good, the internal resistance of the battery can be reduced, and the cycle characteristics are good, while ensuring sufficient binding property between active materials and between the active material and a current collector; a method of producing a nonaqueous battery electrode; and a method of producing a nonaqueous battery.

In order to solve the above problems, the present invention is as follows [1] to [12].

[1] A method of producing a slurry for a nonaqueous battery electrode, wherein the slurry comprises a binder composition comprising an aqueous medium and a binder for a nonaqueous battery electrode;

a conductive auxiliary agent; and an active material, the method comprising:

a dispersing step of dispersing the conductive auxiliary agent in the binder composition;

a mixing step of mixing the conductive auxiliary agent-containing binder composition obtained in the dispersing step with the active material, wherein in the conductive auxiliary agent-containing binder composition, a particle diameter at which particles begin to appear, which is measured according to the degree of dispersion by the JIS K5600-2-5 grain gauge method, is 90 μm or less.

[2] The method of producing the slurry for the nonaqueous battery electrode according to [1], wherein the binder for the nonaqueous battery electrode is a copolymer (P) of a monomer mixture (M) comprising a water-soluble ethylenically unsaturated monomer (A) and a (meta)acrylate salt monomer (B); and the water-soluble ethylenically unsaturated monomer (A) has at least one hydrophilic substituent selected from the group consisting of an amide bond, a sulfo group and a salt thereof, a hydroxy group, a carboxy group, a phosphate group and a salt thereof, a glycidyl group, an alkoxysilyl group and a polyoxyalkylene group.

[3] The method of producing the slurry for the nonaqueous battery electrode according to [2], wherein the water-soluble ethylenically unsaturated monomer (A) comprises an amide bond.

[4] The method of producing the slurry for the nonaqueous battery electrode according to [2], wherein the water-soluble ethylenically unsaturated monomer (A) is a monomer represented by general formula (1),

[Chemical Formula 1]

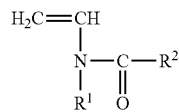

wherein, $R^1$ and $R^2$ each independently represents a hydrogen atom or an alkyl group having 1 to 5 carbon atoms; and an amount of structure derived from the water-soluble ethylenically unsaturated monomer (A) based on the copolymer (P) is 0.5 to 20.0% by mass.

[5] The method of producing the slurry for the nonaqueous battery electrode according to any one of [2] to [4], wherein the water-soluble ethylenically unsaturated monomer (A) is N-vinylformamide or N-vinylacetamide.

[6] The method of producing the slurry for the nonaqueous battery electrode according to any one of [2] to [5], wherein in the copolymer (P), an amount of structure derived from the water-soluble ethylenically unsaturated monomer (A) is 0.5 to 50.0% by mass; and an amount of structure derived from the monomer (B) is 50.0 to 99.5% by mass.

[7] The method of producing the slurry for the nonaqueous battery electrode according to any one of [1] to [6], wherein a weight average molecular weight of the binder for a nonaqueous battery electrode is in the range of 1,000,000 to 20,000,000.

[8] The method of producing the slurry for the nonaqueous battery electrode according to any one of [1] to [7], wherein the active material is a negative electrode active material.

[9] The method of producing the slurry for the nonaqueous battery electrode according to any one of [1] to [8], wherein the amount of the binder in the slurry for a nonaqueous battery electrode is 0.1 to 5.0 parts by mass with respect to 100 parts by mass of the active material.

[10] The method of producing the slurry for the nonaqueous battery electrode according to any one of [1] to [9], wherein the nonaqueous battery is a lithium ion secondary battery.

[11] A method for producing a nonaqueous battery electrode, the method comprising:

applying the slurry for the nonaqueous battery electrode obtained by the method according to any one of [1] to [10] onto a surface of a current collector, and drying the slurry for a nonaqueous battery electrode.

[12] A method of producing a nonaqueous battery, the method comprising:

housing the nonaqueous battery electrode obtained by the method of [11] and the electrolyte solution in an exterior body.

According to the present invention, it is possible to provide a method of producing a slurry for producing a nonaqueous battery electrode in which even a conductive auxiliary agent is used, the dispersion of a conductive auxiliary agent in the nonaqueous battery electrode is good, the internal resistance of the battery can be reduced, and the cycle characteristics are good, while ensuring sufficient binding property between active materials and between the active material and a current collector; a method of producing a nonaqueous battery electrode; and a method of producing a nonaqueous battery

DETAILED DESCRIPTION OF THE INVENTION (Method for Producing Slurry for Nonaqueous Battery Electrode)

The present disclosure is related to a method for producing a slurry for a nonaqueous battery electrode of the present invention wherein the slurry includes a binder composition containing an aqueous medium and a binder for a nonaqueous battery electrode; a conductive auxiliary agent; and an active material. The method for producing the slurry for the nonaqueous battery electrode includes a dispersing step and a mixing step. The dispersing step is a step of dispersing the conductive auxiliary agent in the binder composition. The mixing step is a step of mixing the conductive auxiliary agent-containing binder composition obtained in the dispersing step with the active material.

<1. Dispersing Step>

In the dispersing step of the present invention, examples of methods of dispersing the conductive auxiliary agent in the binder composition include a method of mixing the necessary components using a mixing apparatus such as an agitating type, a rotating type, or a shaking type. In the case of the rotating type, for example, the rotation speed is preferably 750 to 2200 rpm, and more preferably 1000 to 2200 rpm. The rotation time is preferably 1 to 10 minutes, more preferably 2 to 8 minutes.

In the dispersing step of the production method of the present invention, it is desirable that the binder composition and the conductive auxiliary agent have a good affinity.

Although the detailed reason is unknown, it is considered that since there is a good affinity between the binder composition and the conductive auxiliary agent, the affinity causes, for example, physical adsorption and chemical adsorption of the binder to the surface of the conductive auxiliary agent particle, or surface modification of the conductive auxiliary agent particle by the binder; and as a result, an uniform slurry for a nonaqueous battery electrode can be produced in the subsequent mixing step.

Further, in the dispersing step according to the present invention, it is preferable that the state of the conductive auxiliary agent dispersed in the binder composition is maintained as being dispersed in the slurry containing the active material to some extent even after the mixing step described later.

The conductive auxiliary agent-containing binder composition obtained in the dispersing step of the present invention has a particle diameter of 90 μm or less, preferably 80 μm or less, and more preferably 70 μm or less at which a particle begins to appear. The particle diameter is measured in accordance with the degree of dispersion according to the JIS K 5600-2-5 grain gauge method. When the particle diameter is 90 μm or less, it can be said that the affinity between the conductive auxiliary agent and the binder composition is high and the conductive auxiliary agent is uniformly dispersed. The evaluation method of the grain gauge method used in the present invention is described in the Examples.

<2. Mixing Step>

The slurry for a nonaqueous battery electrode of the present embodiment (hereinafter sometimes simply referred to as "slurry") is obtained by mixing the conductive auxiliary agent-containing binder composition obtained in the dispersing step with the active material. The slurry of the present embodiment may contain a thickener as an optional component if necessary. On the other hand, in order to simplify the slurry production process, it is preferable not to include a thickener.

In the mixing step according to the present embodiment, examples of methods of preparing slurry include a method of mixing necessary components by using a mixing apparatus such as an agitating type, a rotating type, or a shaking type. The mixing apparatus may be the same as or different from the mixing apparatus used in the dispersing step. For example, in the case of a rotating type, the rotation speed is preferably 750 to 2200 rpm, and more preferably 1000 to 2200 rpm. The rotation speed may be the same as or different from that of the dispersing step.

<3. Copolymer (P) for Binder for Nonaqueous Battery Electrode>

The binder for a nonaqueous battery electrode of the present embodiment is a copolymer (P) of a monomer mixture (M) containing a water-soluble ethylenically unsaturated monomer (A) and a (meta)acrylate salt monomer (B). The water-soluble ethylenically unsaturated monomer (A) has at least one hydrophilic substituent selected from the group consisting of an amide bond, a sulfo group and a salt thereof, a hydroxy group, a carboxy group, a phosphate group and a salt thereof, a glycidyl group, an alkoxysilyl group and a polyoxyalkylene group. "Water solubility" means that the ethylenically unsaturated monomer (A) is dissolved in water, and specifically, it has a solubility (that is, a limit amount of dissolving a material in 100 g of water at 25° C.) of 1 g or more in 100 g of water at 25° C.

In this specification, "(meta)acrylic" is a generic name for acrylic acid and methacrylic acid, "(meta)acrylate" is a generic name for acrylate and methacrylate, and "(meta)acrylic acid" is a generic name for acrylic acid and methacrylic acid.

The copolymer (P) used as the binder for the nonaqueous battery electrode according to the present embodiment (hereinafter simply referred to as "copolymer (P) for binder" or "copolymer (P)") is used to bind the active materials to each other and to bind the active material to the collector in the electrode of the nonaqueous battery described later. The monomer mixture (M) may further contain an ethylenically unsaturated monomer (C) having a polar functional group other than the water-soluble ethylenically unsaturated monomer (A) and the (meta)acrylate salt monomer (B).

When the copolymer (P) is synthesized, it is preferable to polymerize each monomer in an aqueous medium. The polymerization may be carried out using a radical polymerization initiator in an aqueous medium. Examples of the polymerization method include a method in which all components used for polymerization are charged together and polymerized, and a method in which each component used for polymerization is continuously supplied and polymerized. The polymerization is preferably carried out at a temperature of 30 to 90° C. Specific examples of the polymerization method of the copolymer (P) will be described in detail in the following Examples.

A weight average molecular weight of the copolymer (P) is preferably 1,000,000 to 20,000,000, more preferably 3,000,000 to 20,000,000, and still more preferably 5,000,000 to 20,000,000. The weight average molecular weight is a pullulan equivalent value and can be measured by gel permeation chromatography (GPC).

<3-1. Water-Soluble Ethylenically Unsaturated Monomer (A)>

Examples of the water-soluble ethylenically unsaturated monomer (A) include an ethylenically unsaturated monomer containing an amide bond (—NR$^3$(C=O)— or —(C=O)NR$^4$—), a sulfo group (—SO$_3$H) and a salt thereof, a hydroxy group (—OH), a carboxy group (—COOH), a phosphate group (—OPO(OH)$_2$) and a salt thereof, a glycidyl group, an alkoxysilyl group (the following general formula (2)), or a polyoxyalkylene group (—(OCH$_2$—R$^7$)$_m$—OR$^6$).

[Chemical Formula 2]

(2)

Here, R$^3$ to R$^6$ are each independently a hydrogen atom or an alkyl group having 1 to 5 carbon atoms; R$^7$ is a linear or branched alkylene group having 1 to 5 carbon atoms; n is 0, 1, or 2; and m is an integer of 1 to 200.

Examples of the ethylenically unsaturated monomer containing an amide bond include an ethylenically unsaturated monomer having a bond of —NR$^8$(C=O)R$^9$ and an ethylenically unsaturated monomer having a bond of —(C=O)NR$^{10}$—R$^{11}$. Here, R$^8$ to R$^{11}$ are each independently a hydrogen atom or a 1 to 5 carbon alkyl group.

Specific examples of the ethylenically unsaturated monomer having the bond of —NR$^8$(C=O)R$^9$ include a compound represented by the general formula (1).

[Chemical Formula 3]

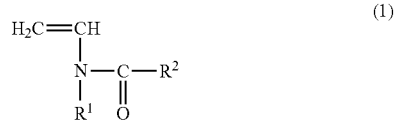

(1)

In the formula, $R^1$ and $R^2$ each independently represents a hydrogen atom or an alkyl group having 1 to 5 carbon atoms.

In the general formula (1), $R^1$ and $R^2$ each independently represents a hydrogen atom or an alkyl group having 1 to 5 carbon atoms. It is preferable that $R^1$ and $R^2$ are each independently a hydrogen atom or an alkyl group having 1 to 3 carbon atoms, and $R^1$ and $R^2$ are each independently a hydrogen atom or a methyl group. Preferred specific examples of the combination of $R^1$ and $R^2$ include $R^1$:H, $R^2$:H (that is, the monomer (A) is N-vinylformamide.); and $R^1$:H, $R^2$:$CH_3$ (that is, monomer (A) is N-vinylacetamide).

Examples of ethylenically unsaturated monomers having a bond of —(C=O)NR$^{10}$—R$^{11}$ include (meta)acrylamide, N-alkyl (meta)acrylamide having an alkyl group of 1 to 4 carbon atoms, N,N-dialkyl (meta)acrylamide having an alkyl group of 1 or 2 carbon atoms, N-hydroxyalkyl (meta)acrylamide having an alkyl group of 1 or 2 carbon atoms, diacetone (meta)acrylamide, and dimethylaminoalkyl (meta)acrylamide having an alkyl group of 1 to 4 carbon atoms in a portion other than the dimethylamino group; (meta)acrylamide-2-methylpropanesulfonic acid, or (meta)acrylamide ethylethylene urea.

Specific examples of ethylenically unsaturated monomers containing a sulfo group or salt thereof include p-styrenesulfonic acid and sodium p-styrenesulfonic acid. The examples also include reactive surfactants having a sulfo group or salt thereof. Specific examples of the reactive surfactant are represented by the following chemical formulas (3) to (6).

[Chemical Formula 4]

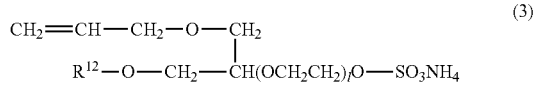

(3)

In the formula (3), $R^{12}$ is an alkyl group, and l is an integer of 10 to 40.

[Chemical Formula 5]

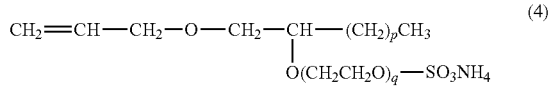

(4)

In the formula (4), p is an integer of 10 to 12, and q is an integer of 10 to 40.

[Chemical Formula 6]

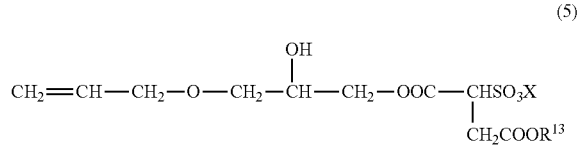

(5)

In the formula (5), $R^{13}$ is an alkyl group, and X is $NH_4$ or Na.

[Chemical Formula 7]

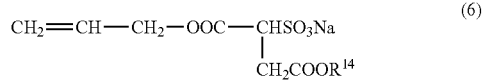

(6)

In the formula (6), $R^{14}$ is an alkyl group.

Specific examples of the ethylenically unsaturated monomers containing a hydroxy group include 2-hydroxyethyl (meta)acrylate and the like. Vinyl alcohol can be introduced by copolymerizing vinyl acetate and then saponifying it.

Specific examples of the ethylenically unsaturated monomer containing a carboxy group or a salt thereof include itaconic acid, (meta)acrylic acid, β-carboxyethyl acrylate, maleic acid, fumaric acid, crotonic acid, half ester of unsaturated dicarboxylic acid, and the like. Among them, (meta)acrylic acid, itaconic acid and β-carboxyethyl acrylate are preferable.

It is set that the water-soluble ethylenically unsaturated monomer (A) does not contain the later-described (meta)acrylate salt monomer (B).

Specific examples of the ethylenically unsaturated monomers containing a phosphate group or a salt thereof include 2-methacryloyloxyethyl acid phosphate, bis (2-hydroxyethyl methacrylate) phosphate, acid phosphoxy polyoxyethylene glycol monomethacrylate, acid phosphoxy polyoxypropylene glycol monomethacrylate, 3-chloro-2-acid phosphooxypropyl methacrylate, methacryloyl oxyethyl acid phosphate monoethanolamine salt, and the like.

Specific examples of the ethylenically unsaturated monomers containing a glycidyl group include glycidyl methacrylate, 4-hydroxybutyl acrylate glycidyl ether, and the like.

Specific examples of the ethylenically unsaturated monomer containing the alkoxysilyl group include 3-methacryloxypropylmethyldimethoxysilane, 3-methacryloxypropyltrimethoxysilane, 3-methacryloxypropylmethyldiethoxysilane, 3-acryloxypropyltrimethoxysilane, and the like.

In the polyoxyalkylene group (—(OCH$_2$—R$^7$)$_m$—OR$^6$), $R^7$ preferably has 1 to 3 carbon atoms; m is preferably from 5 to 175, more preferably from 10 to 150. Specific examples of the ethylenically unsaturated monomers containing a polyoxyalkylene group include polyethylene oxide (meta)acrylate, polypropylene oxide (meta)acrylate, polyethylene/propylene oxide (meta)acrylate, and the like.

<3-2. (Meta)acrylate Salt Monomer (B)>

The (meta)acrylate salt monomer (B) is preferably sodium (meta)acrylate, potassium (meta)acrylate, or ammonium (meta)acrylate. Among them, sodium (meta)acrylate and ammonium (meta)acrylate are more preferable, and sodium acrylate is most preferable. The (meta)acrylate salt monomer (B) is obtained by neutralizing, for example, (meta)acrylic acid with hydroxide, ammonia water or the like, and among them, neutralization with sodium hydroxide is preferable from the viewpoint of availability.

<3-3. Ethylenic Unsaturated Monomer (C)>

The ethylenically unsaturated monomer (C) is a compound having an ethylenically unsaturated bond and a polar functional group other than the water-soluble ethylenically unsaturated monomer (A) and the (meta)acrylate salt monomer (B). Examples of the ethylenically unsaturated monomer (C) include (meta)acrylonitrile as an ethylenically unsaturated monomer having a cyano group.

In the copolymer (P), an amount of the structure derived from the water-soluble ethylenically unsaturated monomer (A) is preferably 0.5 to 50.0% by mass, more preferably 0.5 to 40.0% by mass, and still more preferably 0.5 to 30.0% by mass.

In the copolymer (P), an amount of the structure derived from the (meta)acrylate salt monomer (B) is preferably 50.0 to 99.5% by mass, more preferably 60.0 to 99.5% by mass, and still more preferably 70.0 to 99.5% by mass.

In the copolymer (P), an amount of the structure derived from the ethylenically unsaturated monomer (C) is preferably 0.0 to 10.0% by mass, more preferably 0.0 to 7.5% by mass, and still more preferably 0.0 to 5.0% by mass.

An amount of the water-soluble ethylenically unsaturated monomer (A) in the monomer mixture (M) is preferably 0.5 to 50.0% by mass, more preferably 0.5 to 40.0% by mass, and still more preferably 0.5 to 30.0% by mass.

An amount of the (meta)acrylate salt monomer (B) in the monomer mixture (M) is preferably 50.0 to 99.5% by mass, more preferably 60.0 to 99.5% by mass, and still more preferably 70.0 to 99.5% by mass.

An amount of the ethylenically unsaturated monomer (C) in the monomer mixture (M) is preferably 0.0 to 10.0% by mass, more preferably 0.0 to 7.5% by mass, and still more preferably 0.0 to 5.0% by mass.

In the copolymer (P), the amounts of the structures derived from each monomer can be obtained from the amount of each monomer in the monomer mixture (M). The amount of each monomer in the monomer mixture (M) can usually be obtained from the charge amount of each monomer. On the other hand, when the monomer mixture (M) contains, for example, an ethylenically unsaturated monomer having a strong acid group such as a sulfo group or a phosphate group or (meta)acrylic acid, the structure derived from the (meta)acrylate salt monomer (B) contained in the obtained copolymer (P) may be different from the amount of the (meta)acrylate salt added as the raw material monomer.

<3-4. Polymerization Initiator>

Examples of the radical polymerization initiator used in the polymerization include, but are not limited to, ammonium persulfate, potassium persulfate, hydrogen peroxide, t-butyl hydroperoxide, azo compounds, and the like. When the polymerization is carried out in water, a water-soluble polymerization initiator is preferably used. In addition, if necessary, a radical polymerization initiator and a reducing agent such as sodium bisulfite, Rongalite, ascorbic acid, or the like may be used in combination to perform redox polymerization. An amount of the polymerization initiator to the monomer mixture (M) is preferably 0.01 to 10.0% by mass, more preferably 0.1 to 7.5% by mass, and still more preferably 0.1 to 5.0% by mass.

<3-5. Aqueous Media for Polymerization>

In this embodiment, water is used as an aqueous medium used for polymerization. As long as the polymerization stability of the obtained copolymer for binder is not impaired, a mixture of water and a hydrophilic solvent may be used as an aqueous medium. Examples of hydrophilic solvents added to water include methanol, ethanol, N-methylpyrrolidone and the like.

<3-6. Binder Composition>

The binder composition according to the present embodiment includes a copolymer (P) for a binder and an aqueous medium. The aqueous medium used in the binder composition may be the same as or different from the aqueous medium used in the polymerization described above. For example, a hydrophilic solvent may be added to water. Examples of hydrophilic solvents added to water include methanol, ethanol, N-methylpyrrolidone and the like.

In the present embodiment, when the copolymerization reaction of a monomer mixture (M) containing a water-soluble ethylenically unsaturated monomer (A) and a (meta)acrylate salt monomer (B) is carried out using an aqueous medium, the reaction solution after the polymerization contains a binder copolymer (P) and an aqueous medium. The binder composition can be prepared by adding an aqueous medium to the copolymer (P) for binder obtained by drying the reaction solution. Alternatively, the binder composition may be prepared by removing or adding a portion of the aqueous medium without drying the reaction solution.

The nonvolatile component (solids, binder content) of the binder composition according to the present embodiment is preferably 1 to 20% by mass, more preferably 1 to 15% by mass. The viscosity of the binder composition according to the present embodiment is preferably from 100 to 300,000 mPa·s, and more preferably from 500 to 200,000 mPa·s. The viscosity in this embodiment is measured with a Brookfield type rotational viscometer (For example, TOKI SANGYO TV-25) at a liquid temperature of 23° C. and a rotation speed of 10 rpm.

<4. Conductive Auxiliary Agent-Containing Binder Composition>

The conductive auxiliary agent-containing binder composition of the present embodiment is obtained by dispersing a conductive auxiliary agent in the binder composition in a dispersing step.

<4-1. Conductive Auxiliary Agent>

The conductive auxiliary agent may be any material having electrical conductivity between the active materials. Examples of the conductive auxiliary agent include polymer carbides, carbon fibers, and carbon black such as acetylene black.

<5. Slurry for Non-Aqueous Battery Electrode>

The slurry for the nonaqueous battery electrode of the present embodiment (hereinafter sometimes simply referred to as "slurry") is obtained by mixing the conductive auxiliary agent-containing binder composition obtained in the dispersing step with an active material. The slurry of the present embodiment may contain a thickener as an optional component if necessary, but it is preferable not to contain a thickener in order to simplify the slurry production process.

<5-1. Amount of Copolymer for Binder (P)>

An amount of the binder copolymer (P) in the slurry is preferably 0.1 to 5.0% by mass based on the total mass of the active material and the binder copolymer (P). In this range, the amount is sufficient to ensure the binding property between the active material and the current collector, and the internal resistance when the battery is used becomes low. The amount of the binder copolymer (P) is more preferably 0.3 to 4.5% by mass, most preferably 0.5 to 3.5% by mass.

<5-2. Active Material>

The active material may be any materials capable of intercalating/deintercalating lithium ions or the like. When the slurry is for forming a negative electrode, examples of the active material include a conductive polymer such as polyacetylene, polypyrrole, or the like; coke such as coke, petroleum coke, pitch coke, and coal coke; graphite such as artificial graphite and natural graphite; lithium titanate, silicon, and the like. Among these active materials, carbon materials such as coke and graphite are preferable from the viewpoint of improving the binding property by the copolymer (P) for binder. From the viewpoint of energy density per volume, it is preferable to use carbon black, artificial graphite, natural graphite, lithium titanate, silicon or the like.

When the slurry is for forming positive electrode, examples of the active material include one or a combination of a plurality of lithium complex oxides containing nickel such as lithium cobaltate ($LiCoO_2$), lithium complex oxides of Ni—Co—Mn system, lithium complex oxides of Ni—Mn—Al system, and lithium complex oxides of Ni—Co—Al system; spinel type lithium manganate ($LiMn_2O_4$), olivine type lithium iron phosphate; and chalcogen compounds, such as $TiS_2$, $MnO_2$, $MoO_3$, $V_2O_5$. Other alkali metal oxides can also be used.

<5-3. Aqueous Media for Slurry>

As the aqueous medium used for the slurry, for example, water or a hydrophilic solvent may be further added to the medium used for synthesizing the binder copolymer (P). Examples of the hydrophilic solvent include methanol, ethanol and N-methylpyrrolidone.

<5-4. Properties of Slurry>

In the present embodiment, the nonvolatile amount of the slurry is calculated by weighing about 1 g of a sample in an aluminum dish having a diameter of 5 cm, drying the sample at 130° C. for 1 hour while circulating air in a dryer under atmospheric pressure, and weighing the remaining portion. A nonvolatile amount of the slurry is preferably 30 to 70% by mass, more preferably 40 to 60% by mass. The nonvolatile amount of the slurry is adjusted by the amount of the aqueous medium (dispersion medium).

A viscosity of the slurry is measured with a Brookfield type rotational viscometer (For example, TOKI SANGYO TV-25) at a liquid temperature of 23° C. and a rotation speed of 10 rpm in the present embodiment. The viscosity of the slurry is preferably from 500 to 20,000 mPa·s, and more preferably from 5,000 to 20,000 mPa·s. The viscosity of the slurry is adjusted by the amount of the dispersion medium and the thickener. If the nonvolatile component and viscosity of the slurry are within a suitable range, the coating property to the current collecting plate is excellent and the productivity of the electrode is excellent. From the viewpoint of battery durability, a pH of the slurry at 23° C. is preferably 2 to 10, more preferably 4 to 9, and still more preferably 6 to 9.

<6. Electrode for Nonaqueous Battery>

The electrode for the nonaqueous battery of the present embodiment can be produced by applying the slurry on the surface of the current collector and drying it to form an active material layer. Thereafter, it may be cut to an appropriate size.

Examples of the current collector used for the electrode include, but are not limited to, metals such as iron, copper, aluminum, nickel, and stainless steel. The shape of the current collector is not particularly limited, but a sheet-like collector having a thickness of 0.001 to 0.5 mm is usually used.

A general coating method can be used as the method of applying the slurry on the current collector, and the method is not particularly limited. For example, a reverse roll method, a direct roll method, a doctor blade method, a knife method, an extrusion method, a curtain method, a gravure method, a bar method, a dip method, a squeeze method and the like can be mentioned. Among them, the doctor blade method, the knife method, or the extrusion method is preferably used in view of being suitable for various physical properties such as viscosity and drying properties of the slurry used for the electrode of the nonaqueous battery, and being capable of obtaining a coating film having a good surface condition.

The slurry may be applied only to one side of the current collector or may be applied to both sides. When the slurry is applied to both sides of the current collector, the slurry may be applied one side at a time or simultaneously to both sides. The slurry may be applied continuously or intermittently to the surface of the current collector. The thickness, length and width of the coating film obtained by applying the slurry can be appropriately determined according to the size of the battery or the like.

A method of drying the applied slurry is not particularly limited, but for example, hot air, vacuum, (far) infrared, electron beam, microwave, and cold air can be used alone or in combination. The temperature at which the coating film is dried is preferably in the range of 40 to 180° C., and the drying time is preferably from 1 to 30 minutes.

The current collector on which the active material layer is formed thereon is cut to have an appropriate size and shape as an electrode. A method of cutting the current collector on which the active material layer is formed is not particularly limited, but a slit, a laser, a wire cut, a cutter, a Thomson blade, or the like can be used.

Before or after cutting the current collector on which the active material layer formed thereon, it may be pressed as necessary. As a result, the active material is firmly bound to the electrode, and the electrode is thinned to make the nonaqueous battery compact. As the pressing method, a general method can be used, and it is particularly preferable to use a die pressing method or a roll pressing method. The press pressure is not particularly limited, but preferably 0.5 to 5 $t/cm^2$, which does not affect the intercalating/deintercalating of lithium ions or the like into/from the active material by the press.

<7. Nonaqueous Battery>

In the nonaqueous battery according to the present embodiment, a positive electrode, a negative electrode, an electrolyte, and components such as a separator, if necessary, are housed in an exterior body, and the electrode produced by the above method is used for one or both of the positive electrode and the negative electrode. Examples of the shape of the electrode include, but are not limited to, a laminated body and a wound body.

<7-1. Electrolyte Solution>

A nonaqueous solution having ionic conductivity is used as the electrolyte solution. Examples of the nonaqueous solution include an organic solvent in which an electrolyte is dissolved and an ionic liquid.

As the electrolyte, an alkali metal salt can be used, and it can be appropriately selected according to the kind of the active material or the like. Examples of the electrolytes include $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, LiCl, LiBr, $LiB(C_2H_5)_4$, $CF_3SO_3Li$, $CH_3SO_3Li$, $LiCF_3SO_3$, $LiC_4F_9SO_3$, $Li(CF_3SO_2)_2N$, lithium aliphatic carboxylate, and the like. Salts using other alkali metals may also be used.

An organic solvent dissolving the electrolytes is not particularly limited, and examples thereof include carbonate compounds such as ethylene carbonate (EC), propylene carbonate (PC), diethyl carbonate (DEC), methyl ethyl carbonate (MEC), and dimethyl carbonate (DMC), and nitrile compounds such as acetonitrile.

These electrolytes may be used alone or in combination of two or more electrolytes.

<7-2 Exterior Body>

A metal or aluminum laminate material can be suitably used as the exterior body. The shape of the battery may be any of a coin shape, a button shape, a sheet shape, a cylinder shape, a square shape, a flat shape, and the like.

The battery of this embodiment can be produced by a known producing method.

EXAMPLES

The present invention will be described in more detail below with reference to examples and comparative examples. Table 1 shows the agitating conditions of the producing steps, the components of the binder, the blending ratio of the slurry, and the evaluation results of each sample of each of the examples and the comparative examples. It should be noted that the present invention is not limited thereto.

Example 1

<Preparation of Copolymer (P) for Binder and Preparation of Binder Composition>

N-vinylacetamide (NVA) (Manufactured by Showa Denko K.K.) was used as the water-soluble ethylenically unsaturated monomer (A). Sodium acrylate (AaNa) (prepared as a 28.5 mass % aqueous solution) was used as the (meta)acrylate salt monomer (B). V-50 (2,2'-azobis(2-methylpropionamidine) dihydrochloride, manufactured by Wako Pure Chemical Industries, Ltd.) was used as the polymerization catalyst, and ammonium persulfate (manufactured by Wako Pure Chemical Industries, Ltd.) was used as the polymerization initiator.

A separable flask equipped with a cooling tube, a thermometer, an agitator, and a dropping funnel was charged with 10.0 parts by mass of NVA, 315.8 parts by mass of a 28.5% by mass aqueous solution of AaNa (90.0 parts by mass of AaNa), 0.2 parts by mass of V-50, 0.05 parts by mass of ammonium persulfate, and 9.0 parts by mass of water at 30° C. This was bubbled with nitrogen gas for 1 hour, then the temperature was raised to 80° C., and polymerization was carried out for 4 hours. A product containing the binder copolymer P1 (Binder P1) of the present example and ion-exchanged water was obtained. Thereafter, the mixture was cooled to room temperature, and ion-exchanged water was added so that the nonvolatile content was 10.0% by mass, thereby obtaining the binder composition of the present Example.

The weight average molecular weight (pullulan equivalent value) of the obtained binder copolymer P1 was measured. The measured weight average molecular weight was 5,500,000.

<Measurement of Weight-Average Molecular Weight>

The weight average molecular weight was measured using gel permeation chromatography (GPC) under the following conditions.

GPC equipment: GPC-101 (Manufactured by Showa Denko K.K.)

Solvent: 0.1 M aqueous $NaNO_3$ solution

Sample column: Shodex Column Ohpak SB-806 HQ (8.0 mm I.D.×300 mm)×2

Reference column: Shodex Column Ohpak SB-800 RL (8.0 mm I.D.×300 mm)×2

Column temperature: 40° C.

Sample concentration: 0.1% by mass

Detector: RI-71S (Manufactured by Shimadzu Corporation)

Pumps: DU-H2000 (Manufactured by Shimadzu Corporation)

Pressure: 1.3 MPa

Flow rate: 1 ml/min

Molecular weight standard: pullulan (P-5, P-10, P-20, P-50, P-100, P-200, P-400, P-800, P-1300, P-2500 (Manufactured by Showa Denko K.K.))

<Preparation of Slurry for Negative Electrode>

<Dispersing Step>

1.00 parts by mass of carbon black (Produced by Timcal, BET specific surface area 62 $m^2$/g, bulk density 0.16 g/$cm^3$) as a conductive auxiliary agent and 30.0 parts by mass (binder P1 as a non-volatile component: 3.00 parts by mass) of the binder composition of the present Example were added and agitated at 2000 rpm for 4 minutes using a agitating type mixer (THINKY Corporation's rotation revolution agitating mixer ARE-310) to obtain a carbon black-containing binder composition in which carbon black was dispersed in the binder composition.

<Grain Gauge Method>

A particle diameter at which particles begin to appear of the carbon black-containing binder composition obtained in the present Example was measured according to the degree of dispersion according to JIS K 5600-2-5 (grain gauge method). Using a groove having a maximum depth of 100 μm and a scale interval of 10 μm, a carbon black-containing binder composition was applied with a scraper, and the value of the depth at which streaks started to be generated, that is, the particle size, was determined to be the size of the aggregate. The results are shown in Table 1.

<Mixing Step>

To the carbon black-containing binder composition obtained in the dispersing step of the present Example, 96.0 parts by mass of SCMG (registered trade mark) -XRs (manufactured by Showa Denko K.K.) as negative electrode active materials and 10.0 parts by mass of ion-exchanged water (water for solid kneading) were added, and the mixture was kneaded at 2000 rpm for 4 minutes using an agitating type mixing apparatus (rotation revolution agitating mixer). Further, 63.0 parts by mass of ion-exchanged water (water for main kneading) was added thereto, and further kneading was performed for 4 minutes at 2000 rpm, thereby preparing a slurry (Viscosity 3300 mPa·s) for a negative electrode.

<Preparation of Negative Electrode>

The negative electrode slurry was applied to one side of a copper foil having a thickness of 10 μm as a current collector using a doctor blade so that the amount of application after drying was 4 mg/$cm^2$. The obtained product was heated and dried at 60° C. for 2 minutes and then dried at 100° C. for 10 minutes to form an active material layer. A negative electrode was formed by pressing the material consisting of the active material layer and the current collector with a die press at a press pressure of 1 t/$cm^2$.

The obtained negative electrode was cut out to 22 mm×22 mm, and a negative electrode for evaluation was produced by attaching a conductive tab.

<Preparation of Positive Electrode>

The positive electrode was prepared as follows. First, 90 parts by mass of $LiNi_{1/3}Mn_{1/3}Co_{1/3}O_2$, 5 parts by mass of acetylene black as a conductive auxiliary agent, and 5 parts by mass of polyvinylidene fluoride as a binder were mixed. 100 parts by mass of N-methylpyrrolidone was added to the resulting mixture and further mixed to prepare a positive electrode slurry.

The prepared positive electrode slurry was applied onto an aluminum foil having a thickness of 20 μm as a current collector by a doctor blade method so that the thickness after the roll press treatment was 100 μm. The positive electrode was formed through drying at 120° C. for 5 minutes and a pressing process. The resulting positive electrode was cut into a size of 20 mm×20 mm, and a positive electrode for evaluation was prepared by attaching a conductive tab.

<Battery Production>

A lithium ion secondary battery was produced as follows using the above-mentioned positive electrode for evaluation and negative electrode for evaluation.

An electrolyte solution for use in a lithium ion secondary battery was prepared by dissolving $LiPF_6$ in a mixed solvent prepared by mixing ethylene carbonate (EC) and ethyl methyl carbonate (EMC) at a volume ratio of 40:60 so as to have a concentration of 1.0 mol/L.

A separator made of a polyolefin porous film was interposed between the positive electrode for evaluation and the negative electrode for evaluation, to each of which a conductive tab was attached, and they were housed in an aluminum laminate exterior body (battery package) so that active materials of the positive electrode and the negative electrode were opposed to each other. The electrolyte solution was injected into the exterior body and the exterior body was packed with a vacuum heat sealer to obtain a laminated battery. The evaluation results are shown in Table 1.

TABLE 1

| | | | Example | | | | Comparative Example | | |
|---|---|---|---|---|---|---|---|---|---|
| | | | 1 | 2 | 3 | 4 | 1 | 2 | 3 |
| Slurry composition [parts by mass] | Copolymer P1 for binder | 10% by mass P (NVA-co-AaNa) aqueous solution (nonvolatile) | 30.0 (3.00) | 30.0 (3.00) | 30.0 (3.00) | 30.0 (3.00) | 30.0 (3.00) | 30.0 (3.00) | 30.0 (3.00) |
| | Active material | SCMG ®-XRs | 96.0 | 96.0 | 96.0 | 96.0 | 96.0 | 96.0 | 96.0 |
| | Conductive auxiliary agent | Carbon black | 1.00 | 1.00 | 1.00 | 1.00 | 1.00 | 1.00 | 1.00 |
| | Copolymer for binder P2 | 10% by mass PAaNa aqueous solution (nonvolatile) | — | — | — | — | — | — | — |
| | Copolymer for binder P3 | 2% by mass CMC aqueous solution (nonvolatile) | — | — | — | — | — | — | — |
| | Water for solid kneading | Ion-exchanged water | 10.0 | 10.0 | 10.0 | 10.0 | 10.0 | 10.0 | 10.0 |
| | Water for Main kneading | Ion-exchanged water | 63.0 | 63.0 | 63.0 | 63.0 | 63.0 | 63.0 | 63.0 |
| Dispersing step | (P) + conductive auxiliary agent Mixing step | Agitating conditions | 2000 rpm, 4 min | 2000 rpm, 4 min | 2000 rpm, 6 min | 2000 rpm, 8 min | 500 rpm, 2 min | 500 rpm, 4 min | 500 rpm, 6 min |
| | | Grain gauge [μm] | 80 | 80 | 50 | 40 | 100< | 100< | 100< |
| Mixing step | Conductive auxiliary agent-containing binder + active material + water for solid kneading Solid kneading step | Agitating conditions | 2000 rpm, 4 min | 2000 rpm, 8 min | 2000 rpm, 4 min | 2000 rpm, 4 min | 2000 rpm, 4 min | 2000 rpm, 4 min | 2000 rpm, 4 min |
| | Binder containing conductive auxiliary agent + water for main kneading Main kneading step | Agitating conditions | 2000 rpm, 4 min | 2000 rpm, 4 min | 2000 rpm, 4 min | 2000 rpm, 4 min | 2000 rpm, 4 min | 2000 rpm, 4 min | 2000 rpm, 4 min |
| Evaluation | Slurry viscosity [mPa · s] | | 3300 | 2100 | 3000 | 2800 | 3600 | 3600 | 3300 |
| | Electrode appearance | | A | A | A | A | B (with grains) | B (with grains) | B (with grains) |
| | Peel strength [mN/mm] | | 50 | 36 | 44 | 39 | 24 | 26 | 26 |
| | DCR [Ω] | | 1.4 | 1.4 | 1.3 | 1.2 | 2.0 | 1.9 | 1.9 |
| | Cycle characteristics [%] (25° C., 50 cycles) | | 98% | 97% | 97% | 96% | 93% | 90% | 90% |

| | | | Comparative Example | | | | |
|---|---|---|---|---|---|---|---|
| | | | 4 | 5 | 6 | 7 | 8 |
| Slurry composition [parts by mass] | Copolymer P1 for binder | 10% by mass P (NVA-co-AaNa) aqueous solution (nonvolatile) | 30.0 (3.00) | 30.0 (3.00) | 30.0 (3.00) | — | — |
| | Active material | SCMG ®-XRs | 96.0 | 96.0 | 96.0 | 96.0 | 96.0 |
| | Conductive auxiliary agent | Carbon black | 1.00 | 1.00 | 1.00 | 1.00 | 1.00 |

TABLE 1-continued

| | | | | | | | |
|---|---|---|---|---|---|---|---|
| | Copolymer for binder P2 | 10% by mass PAaNa aqueous solution (nonvolatile) | — | — | — | 30.0 (3.00) | — |
| | Copolymer for binder P3 | 2% by mass CMC aqueous solution (nonvolatile) | — | — | — | — | 150.0 (3.00) |
| | Water for solid kneading | Ion-exchanged water | 10.0 | 10.0 | 10.0 | 10.0 | — |
| | Water for Main kneading | Ion-exchanged water | 63.0 | 63.0 | 63.0 | 63.0 | — |
| Dispersing step | (P) + conductive auxiliary agent Mixing step | Agitating conditions | 2000 rpm, 2 min | None | None | 2000 rpm, 4 min | 2000 rpm, 4 min |
| | | Grain gauge [μm] | 100< | — | — | 100< | 100< |
| Mixing step | Conductive auxiliary agent-containing binder + active material + water for solid kneading Solid kneading step | Agitating conditions | 2000 rpm, 4 min | 2000 rpm, 4 min | 2000 rpm, 16 min | 2000 rpm, 4 min | 2000 rpm, 4 min |
| | Binder containing conductive auxiliary agent + water for main kneading Main kneading step | Agitating conditions | 2000 rpm, 4 min | 2000 rpm, 4 min | 2000 rpm, 4 min | 2000 rpm, 4 min | 2000 rpm, 4 min |
| Evaluation | Slurry viscosity [mPa · s] | | 3400 | 3500 | 1900 | 5800 | 7500 |
| | Electrode appearance | | B (with grains) | B (lump) | A | B | B |
| | Peel strength [mN/mm] | | 44 | 26 | 4 | 14 | 3 |
| | DCR [Ω] | | 1.6 | 1.8 | 1.6 | 2.2 | 2.1 |
| | Cycle characteristics [%] (25° C., 50 cycles) | | 97% | 90% | 93% | 88% | 87% |

Example 2

In Example 2, a slurry for a nonaqueous battery electrode, a nonaqueous battery electrode, and a nonaqueous battery were obtained in the same manner as in Example 1 except that the solid kneading step was carried out at 2000 rpm for 8 minutes. The evaluation results are shown in Table 1.

Examples 3 and 4, Comparative Examples 1 to 4

In Examples 3 and 4 and Comparative Examples 1 to 4, slurries for a nonaqueous battery electrode, nonaqueous battery electrodes, and nonaqueous batteries were obtained in the same manner as in Example 1 except that dispersion was performed under the agitating conditions shown in Table 1 in the dispersing step. The evaluation results are shown in Table 1.

Comparative Example 5

In Comparative Example 5, a slurry for a nonaqueous battery electrode, a nonaqueous battery electrode, and a nonaqueous battery were obtained in the same manner as in Example 1 except that a dispersing step of agitating the carbon black and the binder composition was not included, and in the mixing step, carbon black, a binder composition, SCMG (registered trade mark) -XRs, and 10.0 parts by mass of ion-exchanged water (water for solid kneading) were all charged into the apparatus, and the mixture was solid kneaded; and 63.0 parts by mass of ion exchanged water (water for main kneading) were added and main kneading was conducted. The evaluation results are shown in Table 1.

Comparative Example 6

In Comparative Example 6, a slurry for a nonaqueous battery electrode, a nonaqueous battery electrode, and a nonaqueous battery were obtained in the same manner as in Comparative Example 5 except that the mixture was solid kneaded at 2000 rpm for 16 minutes. The evaluation results are shown in Table 1.

Comparative Example 7

In Comparative Example 7, a copolymer (Copolymer P2 for binder (Binder P2)) for binder and a binder composition (nonvolatile: 10% by mass) thereof were obtained in the same manner as in Example 1, except that the amount of AaNa in the monomer mixture (M) was set to 100% by mass in the preparation of the copolymer (P) for binder (binder) and the preparation of the binder composition. The weight average molecular weight of the copolymer of this comparative example was 7,500,000.

A slurry for a nonaqueous battery electrode, a nonaqueous battery electrode, and a nonaqueous battery were obtained in the same manner as in Example 1 except that the obtained binder composition was used in the dispersing step. The evaluation results are shown in Table 1.

Comparative Example 8

In Comparative Example 8, the dispersing step was carried out in the same manner as in Example 1 except that 150.0 parts by mass (3.00 parts by mass of CMC as a nonvolatile component) of CMC (MAC 350HC, manufactured by Nippon Paper Group, Inc., weight average molecular weight: 5,000,000, degree of substitution: 0.9) containing 2% nonvolatile was used as a binder copolymer (Binder P3) in the preparation of the binder copolymer (P) (binder) and the binder composition.

96.0 parts by weight of SCMG (registered trade mark) -XRs were added to the carbon black-containing binder composition obtained in the dispersing step, and the mixture was solid kneaded at 2000 rpm for 4 minutes using an agitating type mixer (Rotation revolution agitating mixer). Further, main kneading was performed at 2000 rpm for 4 minutes to prepare a slurry for a nonaqueous battery electrode.

Thereafter, a nonaqueous battery electrode and a nonaqueous battery were obtained by the same manner as in Example 1. The evaluation results are shown in Table 1.

Evaluation Method of Examples and Comparative Examples

Appearance of the slurry for the negative electrode, electrode performance, and battery performance of each Example and Comparative Example were evaluated. The evaluation methods are as follows, and the evaluation results are as shown in Table 1.

(Appearance of Slurry)

The slurry was visually checked for appearance, and the size of the aggregates and lumps were measured on a micrometer. When there was a lump having a maximum size of 1 mm or more in the slurry, it was judged to be "B", and in other cases, it was judged to be "A".

(Appearance of Negative Electrode)

The electrodes were visually checked for appearance and the size of the aggregates and lumps were measured with a micrometer. When a lump with a maximum size of 1 mm or more was confirmed, or when a streak was found in the electrode, it was judged to be "B", and in other cases, it was judged to be "A".

(Peeling Strength of Negative Electrode Active Material Layer)

The active material layer formed on the current collector of the negative electrode and the SUS plate were bound together using a double-sided tape (NITTOTAPE No. 5), and the value obtained by peeling at 180° with a peeling width of 25 mm and a peeling speed of 100 mm/min was defined as the peeling strength.

(Internal Resistance)

The internal resistance (DCR ($\Omega$)) of the produced battery was measured as follows.

A constant current charge of 0.2 C was performed from the rest potential to 3.6 V, and the state of charge (SOC) was set to 50%. Then, discharge was performed for 60 seconds at current values of 0.2 C, 0.5 C, 1 C, and 2 C. The DCR ($\Omega$) at 50% SOC was determined from the relationship between the four current values (value per second) and the voltage.

(Cycle Characteristic)

The cycle characteristics of the produced batteries were measured as follows. In the charge/discharge cycle test of the battery, under the condition of 60° C., the battery is charged by CC-CV charging (charging at CC (1 C) until the battery reaches the upper limit voltage (4.2 V), and then charging at CV (4.2 V) until the battery reaches 1/20 C). After standing for 30 minutes, CC discharging (discharging at CC (1 C) until the battery reaches the lower limit voltage (2.75 V)) was performed. The tests were repeated. The charge/discharge cycle characteristic of the battery at high temperature was evaluated by using a capacity maintenance ratio, which is a ratio of the discharge capacity of the 50th cycle to the discharge capacity of the first cycle, as an index. A battery having a capacity maintenance ratio of 95% or more was judged to be a battery having a good charge/discharge cycle characteristics.

Evaluation Results of Examples and Comparative Examples

As can be seen from Table 1, in Examples 1 to 4, the appearance of the electrodes (negative electrode) is good, and the peel strength (mN/mm) of the negative electrode active material layers also showed a sufficient value. Moreover, the internal resistance of the batteries was low, and the cycle characteristics were good.

On the other hand, in Comparative Examples 1 to 3 in which the agitating speeds in the dispersing step of mixing the carbon black and the binder composition were small, aggregates are 100 µm or more by the grain gauge, a lump having the longest dimension of 1 mm or more on the electrode surface was observed, and appearance of electrode was poor. Further, in Comparative Example 4 in which the agitating time in the dispersing step of mixing the carbon black and the binder composition was short, the aggregate was 100 µm or more by the grain gauge, and a lump with the longest dimension of 1 mm or more on the electrode surface was observed, and appearance of electrode was poor.

On the other hand, in Comparative Example 5, which did not include the dispersing step of mixing the carbon black and the binder composition, a lump with a maximum dimension of 1 mm or more on the electrode surface was observed, and appearance of electrodes was poor. In Comparative Example 6 in which the kneading time was long, the electrode state was good, but the peel strength was low, and the internal resistance and cycle characteristics of the battery were insufficient.

Appearance of the electrodes prepared in Comparative Examples 7 and 8 had aggregates, and the internal resistance of a battery could not be sufficiently reduced.

Using the binder copolymer P1 of Example 1, the slurries of Examples 1 to 4 were produced by a production method including a dispersing step and a mixing step. The obtained slurry was applied on a current collector and dried to prepare active materials of negative electrodes of Examples 1 to 4. From the above evaluation results, the obtained negative electrode active material layer has no problem in appearance and has sufficient peel strength. In addition, the non-aqueous battery using the negative electrode active material layer can reduce the internal resistance and exhibits good cycle characteristics.

Further, the negative electrodes of Examples 1 to 4 were prepared using the slurries prepared by the methods of Examples 1 to 4. In the obtained electrodes, no aggregate was observed on the electrode surface, and sufficient binding properties were ensured between the negative electrode active materials and between the negative electrode active material and the current collector. In addition, the nonaqueous battery using the obtained negative electrode can reduce the internal resistance and exhibits good cycle characteristics.

Further, the copolymer (P) for a binder of the present invention can be used as a binder for a positive electrode active material (for a non-aqueous battery positive electrode). The positive electrode using this binder can ensure sufficient binding property between the positive electrode active materials and between the positive electrode active material and the current collector. In addition, a battery using this positive electrode can reduce the internal resistance and exhibit good cycle characteristics.

The invention claimed is:

1. A method of producing a slurry for a nonaqueous battery electrode, wherein the slurry comprises
 a binder composition comprising an aqueous medium and a binder for a nonaqueous battery electrode;
 a conductive auxiliary agent; and
 an active material,
 the method comprising:
 a dispersing step of dispersing the conductive auxiliary agent in the binder composition;
 a mixing step of mixing the conductive auxiliary agent-containing binder composition obtained in the dispersing step with the active material,
 wherein in the conductive auxiliary agent-containing binder composition, a particle diameter at which particles begin to appear, which is measured according to the degree of dispersion by the JIS K5600-2-5 grain gauge method, is 90 μm or less;
 the binder for the nonaqueous battery electrode is a copolymer (P) of a monomer mixture (M) which comprises a water-soluble ethylenically unsaturated monomer (A) and a (meta)acrylate salt monomer (B);
 an amount of structure derived from the water-soluble ethylenically unsaturated monomer (A) is 0.5 to 50.0% by mass in the copolymer (P);
 an amount of structure derived from the monomer (B) is 50.0 to 99.5% by mass in the copolymer (P); and
 the monomer mixture (M) comprises no ethylenically unsaturated monomer having an amino group.

2. The method of producing the slurry for the nonaqueous battery electrode according to claim 1,
 wherein the water-soluble ethylenically unsaturated monomer (A) has at least one hydrophilic substituent selected from the group consisting of an amide bond, a sulfo group and a salt thereof, a hydroxy group, a carboxy group, a phosphate group and a salt thereof, a glycidyl group, an alkoxysilyl group and a polyoxyalkylene group.

3. The method of producing the slurry for the nonaqueous battery electrode according to claim 1,
 wherein the water-soluble ethylenically unsaturated monomer (A) comprises an amide bond.

4. The method of producing the slurry for the nonaqueous battery electrode according to claim 1, wherein the water-soluble ethylenically unsaturated monomer (A) is a monomer represented by general formula (1),

[Chemical Formula 1]

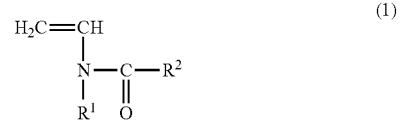

wherein, $R^1$ and $R^2$ each independently represents a hydrogen atom or an alkyl group having 1 to 5 carbon atoms; and
 an amount of structure derived from the water-soluble ethylenically unsaturated monomer (A) based on the copolymer (P) is 0.5 to 20.0% by mass.

5. The method of producing the slurry for the nonaqueous battery electrode according to claim 1, wherein the water-soluble ethylenically unsaturated monomer (A) is N-vinylformamide or N-vinylacetamide.

6. The method of producing the slurry for the nonaqueous battery electrode according to claim 1, wherein in the copolymer (P),
 an amount of structure derived from the water-soluble ethylenically unsaturated monomer (A) is 0.5 to 40.0% by mass; and
 an amount of structure derived from the monomer (B) is 60.0% to 99.5% by mass.

7. The method of producing the slurry for the nonaqueous battery electrode according to claim 1, wherein a weight average molecular weight of the binder for a nonaqueous battery electrode is in the range of 1,000,000 to 20,000,000.

8. The method of producing the slurry for the nonaqueous battery electrode according to claim 1, wherein the active material is a negative electrode active material.

9. The method of producing the slurry for the nonaqueous battery electrode according to claim 1, wherein an amount of the binder in the slurry for the nonaqueous battery electrode is 0.1 to 5.0 parts by mass with respect to 100 parts by mass of the active material.

10. The method of producing the slurry for the nonaqueous battery electrode according to claim 1, wherein the nonaqueous battery is a lithium ion secondary battery.

11. A method for producing a nonaqueous battery electrode, the method comprising:
 applying the slurry for the nonaqueous battery electrode obtained by the method according to claim 1 onto a surface of a current collector, and
 drying the slurry for a nonaqueous battery electrode.

12. A method of producing a nonaqueous battery, the method comprising:
 housing the nonaqueous battery electrode obtained by the method of claim 11 and an electrolyte solution in an exterior body.

* * * * *